(12) United States Patent
Somanath et al.

(10) Patent No.: US 11,248,989 B2
(45) Date of Patent: Feb. 15, 2022

(54) SYSTEM AND METHOD FOR ANALYZING ENGINE TEST DATA IN REAL TIME

(71) Applicant: United Technologies Corporation, Farmington, CT (US)

(72) Inventors: Nagendra Somanath, South Windsor, CT (US); Justin R. Urban, Tolland, CT (US); Michael J. Giering, Bolton, CT (US); Quan Long, West Hartford, CT (US); Alexandria Dorgan, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 213 days.

(21) Appl. No.: 16/448,365

(22) Filed: Jun. 21, 2019

(65) Prior Publication Data

US 2020/0400531 A1 Dec. 24, 2020

(51) Int. Cl.
*G01M 15/14* (2006.01)
*B64F 5/60* (2017.01)
*F02D 35/02* (2006.01)

(52) U.S. Cl.
CPC .............. *G01M 15/14* (2013.01); *B64F 5/60* (2017.01); *F02D 35/02* (2013.01)

(58) Field of Classification Search
CPC ................................. G01M 15/14; B64F 5/60
See application file for complete search history.

(56) References Cited

U.S. PATENT DOCUMENTS

| 10,089,203 | B2 | 10/2018 | Mohan et al. |
| 2013/0060524 | A1 | 3/2013 | Liao |
| 2017/0024649 | A1 | 1/2017 | Yan et al. |

OTHER PUBLICATIONS

Rengasamy, Divish, Herve P. Morvan, Grazziela P. Figueredo, Deep Learning Approaches to Aircraft Maintenance, Repair, and Overhaul: A Review, Aug. 2018.

*Primary Examiner* — Eric S. McCall
(74) *Attorney, Agent, or Firm* — Carlson, Gaskey & Olds, P.C.

(57) ABSTRACT

A system for providing real time aircraft engine sensor analysis includes a computer system configured to receive an engine operation data set in real time. The computer system includes a machine learning based analysis tool and a user interface configured to display a real time analysis of the engine operation data set. The user interface includes at least one portion configured to identify a plurality of anomalies in the engine operation data set.

19 Claims, 4 Drawing Sheets

SYSTEM AND METHOD FOR ANALYZING ENGINE TEST DATA IN REAL TIME

TECHNICAL FIELD

The present disclosure relates generally to a system for analyzing and detecting anomalies in engine sensor data in real time.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. In some examples, a fan is also connected to the shaft and is driven to rotate via rotation of the turbine as well.

During operation of gas turbine engines, multiple sensors provide data regarding the engine conditions and operations to controllers throughout the engine. This is true during test operations, as well as during actual engine flights and during pre-check operations. Analysis of the data to detect anomalies and other variations in the test data can take substantial amounts of time when performed manually, and can result in insufficient response time to an anomaly. In addition, some types of anomalies can go undetected by individual sensor data when each sensor is within a predefined acceptable range despite the presence of the anomaly.

SUMMARY OF THE INVENTION

In one exemplary embodiment a system for providing real time aircraft engine sensor analysis includes a computer system configured to receive an engine operation data set in real time, the computer system including a machine learning based analysis tool, a user interface configured to display a real time analysis of the engine operation data set, the user interface including at least one portion configured to identify a plurality of anomalies in the engine operation data set.

In another example of the above described system for providing real time aircraft engine sensor analysis the machine learning based analysis tool is a multi-input multi output deep auto-encoder (MIMODAE) tool.

In another example of any of the above described systems for providing real time aircraft engine sensor analysis the machine learning based analysis tool is trained by providing a plurality of normalized data sets to an encoder portion of the MIMODAE tool.

In another example of any of the above described systems for providing real time aircraft engine sensor analysis the normalized data sets are outputs of at least one engine sensor and wherein the machine learning based analysis tool learns at least one of a correlation between the outputs of at least two engine sensors at a single point in time or a correlation between the output of a single engine sensor at at least two different points in time.

In another example of any of the above described systems for providing real time aircraft engine sensor analysis the encoder portion includes at least three encoder layers.

In another example of any of the above described systems for providing real time aircraft engine sensor analysis each encoder layer in the at least three encoder layers is configured to determine relationships between data points within the plurality of normalized data sets at a given time, and wherein the relationships are indicative of a presence of one or more anomalies.

In another example of any of the above described systems for providing real time aircraft engine sensor analysis the MIMODAE tool includes an input, and wherein the input is configured to be expanded across a decoder portion.

In another example of any of the above described systems for providing real time aircraft engine sensor analysis the decoder portion includes at least three decoder layers.

In another example of any of the above described systems for providing real time aircraft engine sensor analysis the computer system is configured to receive a plurality of engine operation data sets in real time, and wherein the user interface includes a main screen, the main screen including an operation tile corresponding to each of the engine operation data sets in the plurality of engine operation data sets.

In another example of any of the above described systems for providing real time aircraft engine sensor analysis each operation tile includes a display indicative of an engine operation completion percentage and at least one text information display.

In another example of any of the above described systems for providing real time aircraft engine sensor analysis each operation tile is expandable, and wherein an expanded engine operation tile includes an engine operation completion percentage and a sensor map.

In another example of any of the above described systems for providing real time aircraft engine sensor analysis the sensor map is configured to highlight sensors corresponding to anomalous sensor readings in real time by illuminating a position on the sensor map corresponding to a position of the sensor.

In another example of any of the above described systems for providing real time aircraft engine sensor analysis the sensor map comprises a plurality of engine cross sections along an engine centerline axis.

In another example of any of the above described systems for providing real time aircraft engine sensor analysis a prominence of the illumination corresponds to a time since the occurrence of the anomalous sensor reading.

An exemplary method for analyzing engine operation data in real time includes receiving at least one engine operations data set in real time, wherein at least one engine operations data set includes at least 1000 sensor data points at each time entry, analyzing the at least one engine operations data set using a multi-input multi output deep auto-encoder (MIMODAE) tool, wherein the MIMODAE includes at least three encoder layers configured to learn relationships among sensor outputs in a plurality of nominal test data sets, and at least three decoder layers configured to analyze relationships between data points in the at least one engine operations data set and determine a presence of an anomaly when a relationship between data points in the at least one engine operations data set diverges from an expected relationship based on a learned relationship among the sensor outputs in the plurality of nominal test data sets.

Another example of the above described method for analyzing operation data in real time further includes notifying a user of the anomaly in response to determining the presence of the anomaly.

In another example of any of the above described methods for analyzing operation data in real time notifying the user comprises changing a display of a user interface.

In another example of any of the above described methods for analyzing operation data in real time changing the display comprises illuminating a sensor position on a sensor map, and wherein the sensor position corresponds to the sensor providing the anomaly.

In another example of any of the above described methods for analyzing operation data in real time changing the display comprises altering an appearance of an operations tile corresponding to an engine operation data set in the at least one engine operations data set including the anomaly.

In another example of any of the above described methods for analyzing operation data in real time the at least one engine operations data set includes a plurality of engine operations data sets, and wherein the plurality of engine operations data sets are simultaneously analyzed.

These and other features of the present invention can be best understood from the following specification and drawings, the following of which is a brief description.

DETAILED DESCRIPTION

Figure 1:
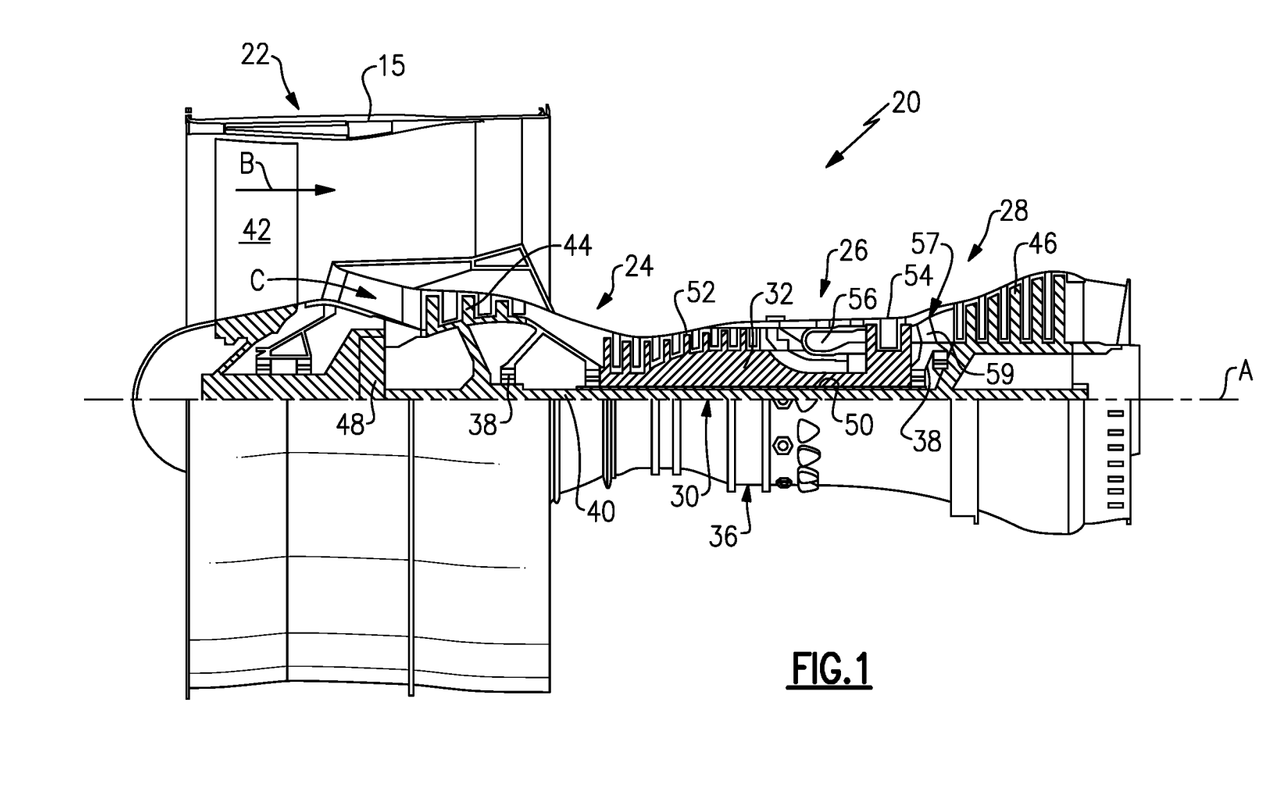
FIG. 1 illustrates an exemplary gas turbine engine according to one example.

FIG. 1 schematically illustrates an exemplary gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicyclic gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

While FIG. 1 illustrates a single specific example gas turbine engine 20, it is understood that the concepts described herein pertain to any type of turbine engine, and the example engine 20 is illustrated for explanatory effect and to provide context for one implementation of the system and device described below. In some examples, the real time analysis system can be stored in a controller memory of an aircraft, and operated by a pilot. In other examples, the real time analysis system can be stored in a computer, or other type of controller, remote from the engine. In both cases the computer or controller stores the trained analysis system and receives the live engine data from the operating engine.

During operation of the exemplary gas turbine engine 20, substantial amounts of data is generated from multiple sensors within the engine 20, whether the engine 20 is a test engine (i.e. an engine positioned in a test laboratory) or is a production engine (i.e. an engine installed on an aircraft). By way of example, some test engines include between 1000 and 3000 distinct sensors including pressure transducers, thermocouples, strain gages, accelerometers and any similar types of sensors. Production engines can include similar ranges of distinct sensors.

In some examples, as much as 40 GB of data is retrieved from a single engine 20 during a day's operation, and the data can be taken at rates of between 10 and 100,000 samples per second. Included within this data can be anomalies indicative of missing or bad sensors, anomalous readings, early indicators of problem conditions, and real time alterations in engine behavior. Screening and evaluating the data generated by the example engine 20 takes substantial lengths of time and would be impossible to perform manually during operation of the engine 20 due to the magnitude of data generated during operation of the engine 20, as well as the speed at which the data is generated.

Figure 2:
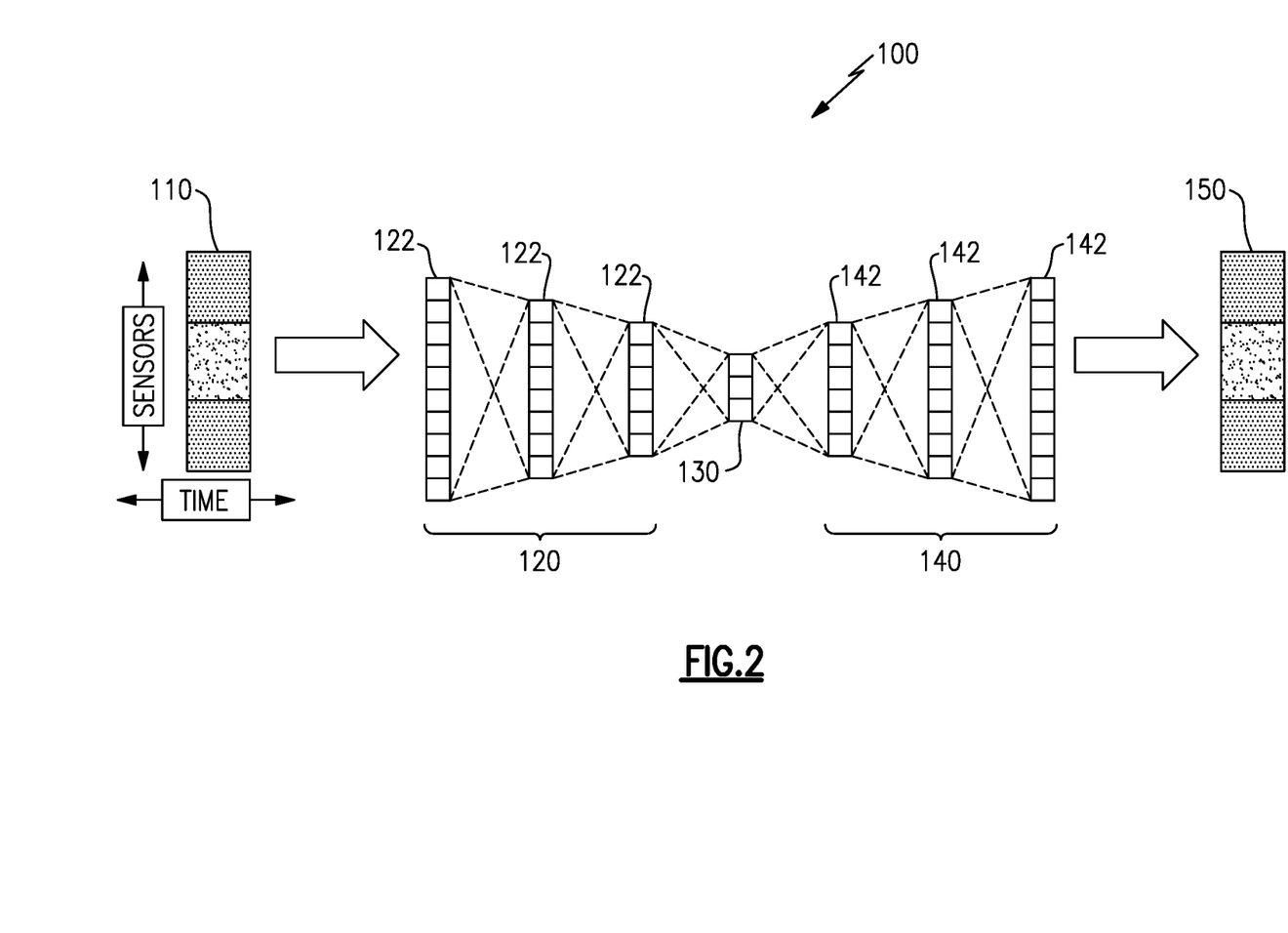
FIG. 2 illustrates an exemplary machine learning system for performing real time analysis of engine sensors.

With continued reference to FIG. 1, FIG. 2 illustrates an exemplary deep learning system 100 configured to receive engine data, generate an analysis procedure based on a machine learning algorithm such as a multi input multi output deep auto-encoder (MIMODAE), and analyze incoming engine data in real time. Initially test data 110 is provided to an encoder portion 120 of the MIMODAE system.

The test data 110 is in the form of sensor data with respect to time, and is normalized so that all sensor data included within the test data 110 is at the same scale. By way of example, if a first sensor provides 10 readings per second and a second sensor provides 100 readings per second, the test data 110 would be at the scale of 100 entries per second, with the first sensor data being repeated until a new value is provided. In alternative examples, alternative normalization methods can be used, including gradual transition between data points, averaging, weighted averaging, and the like. The test data 110 is nominal data, and does not contain any known anomalies. In the event that anomalies are found to be present within the test data 110, the test data is modified to remove the anomalies and the MIMODAE system 100 reprocesses the test data.

The encoder portion 120 utilizes multiple layers 122 to learn relationships among the data points from sensors in the data 110 over multiple nominal data sets 110, such as engine tests, engine flights, and the like. The relationships are determined using nonlinear dimensionality reduction of data from many sensors within the test data set simultaneously. Once the encoder portion 120 has deconstructed a sufficient number of test data 110 sets, the MIMODAE system 100 is ready to detect anomalies in real time engine data.

When used to analyze real time engine data, data from an actual engine operation is provided to an input 130. The input data is reconstructed across multiple layers 142 of a decoder 140 and is output at a model output 150. When the relationships between inputs change during the reconstruction in the decoder 140, the reconstruction is less accurate, and an anomaly is detected. Once the anomaly is detected, it is possible to identify, using the model 150, which input sensor, or sensors, are the root cause of the anomaly. This detection is performed in approximately real time. As used herein, approximately real time refers to a detection within a time scale of less than 0.01 seconds, accounting for the delay in calculation time of the MIMODAE system 100. While MIMODAE machine learning algorithms use a deep learning analysis, it is appreciated that alternative machine learning approaches could be utilized to develop the expected operations models in alternative embodiments and the overall system could function in a similar manner.

The exemplary MIMODAE system 100 uses an Eulerian time window approach to decide the resolution of the anomaly detection method. In the moving time window, the empirical entropy of the signals is estimated and non-informative signals are identified when the empirical entropy stays constant as the time evolves. Changes in slope or curvature identify information change that can be detected in informative signals. Further numerical examination of the character of the signal from a given sensor experiencing a sensor fault (an anomaly) determines if the fault is a clipping at the maximum (e.g. detected values exceed the maximum threshold of the sensor), a clipping at the minimum (e.g. detected values fall below the minimum threshold of the sensor), a random drop out (e.g. the sensor randomly ceases detection for a period of time), an out of range signal, a flat line within a range, a signal that is no longer correlated with it's underlying drivers, a miscorrelation between sensors, a discontinuous signal, or any other type of default.

Further anomaly detection is achieved via the correlation of sensor outputs from multiple sensors when the sensors are positioned proximate each other and/or sense related outputs. Such anomalies can be detected based on the correlation between the sensor signals, even when both sensors read individually would not detect an anomaly.

Figure 3:
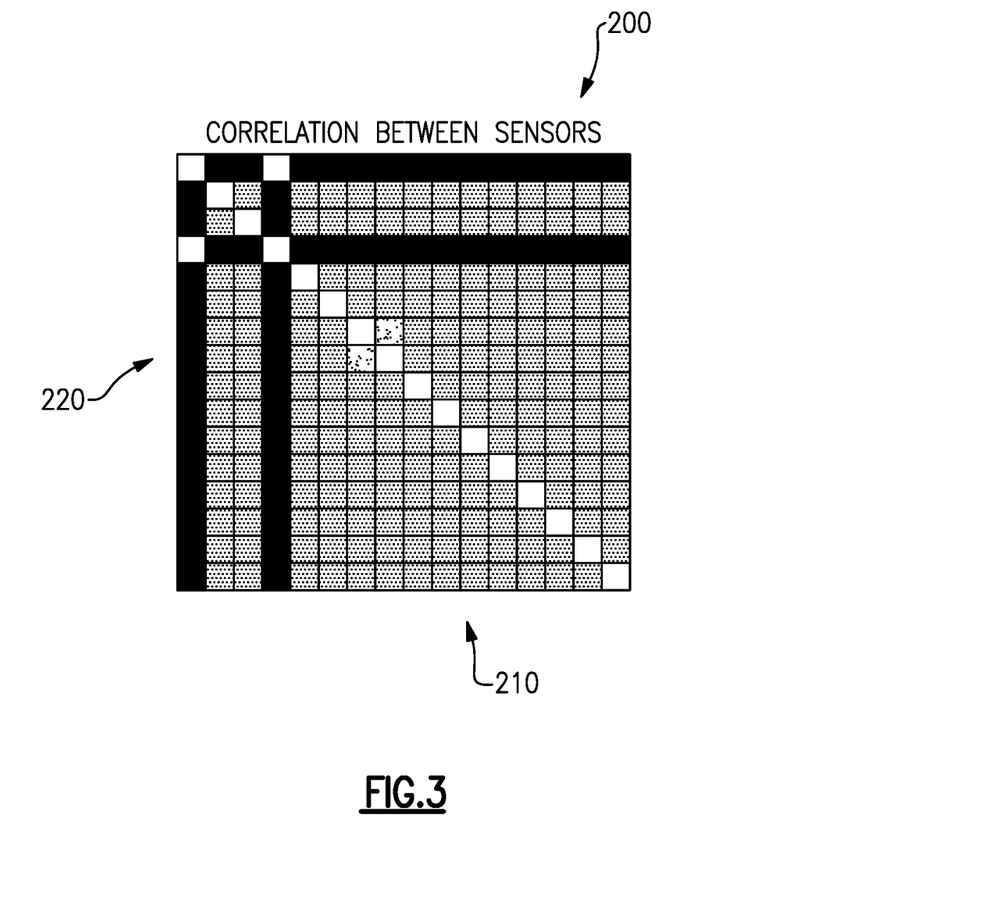
FIG. 3 schematically illustrates an exemplary correlation chart for sensor data provided from engine sensors.

With continued reference to FIG. 2, FIG. 3 illustrates an exemplary correlation matrix 200 identifying correlations between two sensor outputs 210, 220, as determined by one or more layers 142 of the decoder 140. In the exemplary matrix 200, the lighter a portion is, the more correlated the sensor outputs 210, 220 are, with a 1:1 (perfect) correlation being the lightest zone. In detecting an anomaly the encoder portion 120 of the MIMODAE system 100 determines a range of expected correlations, and any correlations that fall outside that range on the matrix 200 are determined to be anomalous. While illustrated as a matrix 200 of two sensor values 210, 220 it is understood that additional encoder layers 122 and decoder layers 142 can determine multi-sensor correlation matrices between any number of correlated sensors, and the correlation is not limited to two sensors.

In one example, a low correlation between a temperature/pressure sensor signal and a fuel injection rate would be an indicator of a possible sensor failure, as the two signals should have a high level of correlation. In some examples, the top correlated sensors of subsets of sensors can be used as a proxy for corrupted sensors to replace the corrupted sensor signals during a time window in which the sensor signal is anomalous.

In addition to utilizing the correlation between signals to identify anomalies, the MIMODAE system 100 uses rule based and statistical methods to determine an anomaly based on the measure of entropy within a single signal, and uses deep auto-encoder methods based in deep learning temporal convolutional neural networks (TCNN) to identify anomalies.

Several analytical methods can be used to determine the anomalies. In one example, an entropy based sensor monitoring system can be utilized to determine the presence of an anomaly. By way of example, for time series data, the entropy of a sliding time window can be calculated as $H=-\Sigma p_i \log(p_i)w_i$, with $$p_i = \frac{N_i}{Nw_i},$$

where $p_i$ is the empirical density, $N_i$ is the number of samples in the i-th bin, N is the total number of samples in the moving window, $w_i$ is the bin width. The entropy is a measurement of information or structure within the data. A high entropy corresponds to less structure, while a low entropy corresponds to more structure. When the entropy is at the extreme ends of either high or low, this is indicative of one or more types of anomalies.

By way of example, a sensor that has failed or a sensor that is clipping will result in a flat-line output with no changes over a period of time. This corresponds with a low entropy due to the consistent structure in the data. Conversely, sensors with a bad electrical connection or another failure mode inducing electrical noise, will correspond with a high entropy.

In another example analytical method, the rate of change of sensor measurements over a given time window is measured. This analysis is referred to as a trending analysis. When the data within a given time window changes uncharacteristically fast, or uncharacteristically slow, the sensor data can be indicative of an anomaly.

In another example, correlation based methods are used to track the correlations across two or more sensors through a time window. Due to the design of turbine engine sensor systems, there are a number of sensors or sensor sets that monitor highly correlated data (e.g. a first stage temperature sensor and a second stage temperature sensor for a compressor should have highly correlated outputs).

With reference now to both FIGS. 2 and 3, the data sets used in both the training and actual engine operations includes time-stamped data-points for all sensors (K). A moving window of sensor data with a width (W) of a predetermined period of time is the model input at any given point after data normalization has occurred. The data is vectorized into a single K*W vector. The vector is then provided to the appropriate input and analyzed by the MIMODAE system 100.

While the above MIMODAE system 100 is capable of identifying anomalies, the data exported from the model, including the data identifying the anomalies, is difficult or impossible for a human operator to read in sufficient time to react appropriately. In order to rectify this, the data is filtered through a user interface which allow a human operator to more quickly parse the data.

With continued reference to FIGS. 1-3, FIGS. 4 and 5 illustrates a user interface 300 (FIG. 4) and a zoomed in portion 302 of the user interface 300 in one example. The user interface 300 presents the analyzed data from one or more engine tests and operations in real time. It is appreciated that any number of distinct users, having distinct usages of the data, will be monitoring the data using the user interface 300. By way of example a rig test user could use the user interface 300 to monitor the operations of a single engine test and ensure that all things are working well on the test. In another example, an in flight user, such as a pilot, may use the data analyzed to provide further analysis, checks, and operational changes to the engine operations. In yet another example, a remote validity user may use the user interface 300 to monitor raw data from multiple engine operations simultaneously so that they can notify others as to the best way to respond when an anomaly occurs.

As can be appreciated, the wide variety of uses requires a relatively simple and easy to parse user interface 300. The initial user interface 300, illustrated in FIG. 4, includes a general data field 310 that displays a timeline of test operations, as well as general information date, time, weather, etc. Also disposed in the main screen of the user interface 300 are multiple distinct operation tiles 320, 322, 324. Each of the operation tiles 320, 322, 324 corresponds to a single engine operation and displays an overall quantity of good sensors of the corresponding operation as a percentage. A scrolling chart 330 can be utilized to highlight sensor output, or outputs, that are of particular relevance to the corresponding flight or engine test. In addition, identifying information 332 pertaining to the corresponding engine operation is included in the operation tile 320, 322, 324. By way of example, the identifying information can include an engine serial number, a location of the engine operation, a type of engine operation (e.g. test, in flight, etc.), and any similar high level information.

Figure 4:
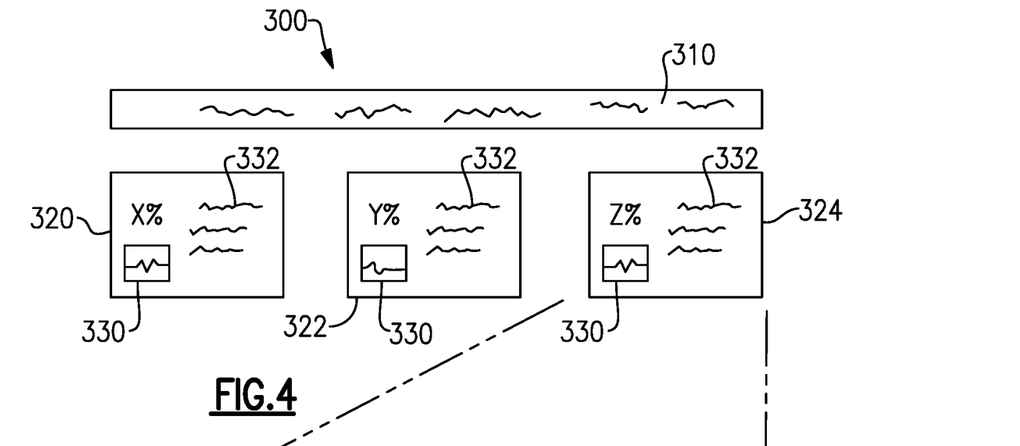
FIG. 4 illustrates a first view of an exemplary user-interface for a real-time analysis system.

In some examples, when a noteworthy anomaly occurs, the operations tile 320, 322, 324 corresponding to the anomaly can be configured to flash, change colors, or otherwise provide a visual indicator that can draw an operator's attention to the operations tile 320, 322, 324.

Figure 5:
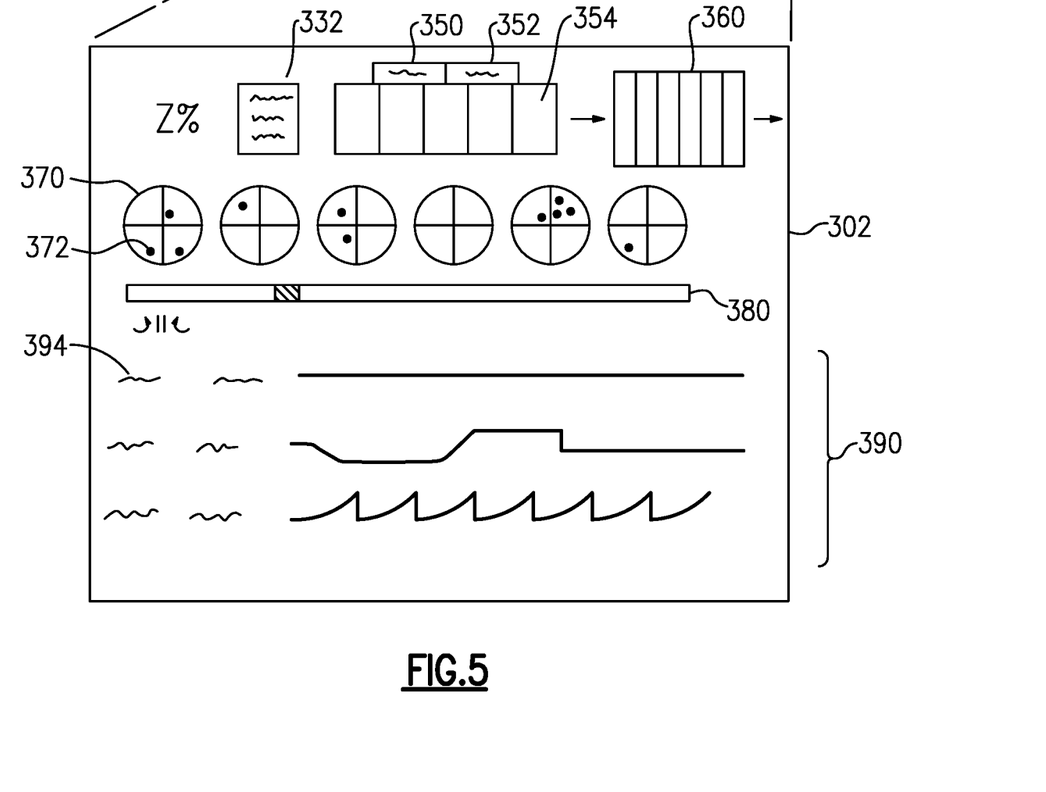
FIG. 5 illustrates a second view of the exemplary user-interface for the real time analysis system.

If a user of the user interface 300 wishes to be more informed about a specific operation 320, 322, 324 the user selects the operation tile 320, 322, 324 which causes the user interface to expand that operation tile as illustrated in the user interface portion 302 of FIG. 5. The expanded operations tile 302 includes the progress percentage and the identifying information 332. In addition, the user interface 302 displays engine operation details including a start time 350, a run time 352 of the engine, as well as engine operational details 354, such as thrust, high rotor speed, low rotor speed, fan flow, etc. Also disposed in the top corner is a schematic engine map 360 which breaks the engine into multiple cross sections. Each of the cross sections corresponds to a physical cross section along the length of the centerline of the engine 20. For each cross section, a sensor map 370 is displayed. Included within each sensor map 370 are sensor indicators 372 that display when a corresponding sensor is experiencing an anomaly.

In some examples, the sensor indicators 372 can be illuminated brightly when the anomaly occurs, and fade out over time as the anomaly fades out. In this example, the brightness increases or decreases the prominence of the indicator, and other methodologies for indicating prominence could be used to similar effect. In alternative examples, a color indication can be utilized to indicate when the anomalies are new or old. In alternative examples, the shape of the indicator can be used to indicate a type of sensor, or a type of anomaly. In yet further alternatives the examples can be combined and brightness, shape, and color can be utilized. A progress slider 380 is positioned below the sensor map 370 and allows a user to move backwards and forwards through the existing test data. This movement is reflected by the indicators 372 and allows the user to observe how the anomalies change over time.

Displayed below the sensor map 370 and the progress slider 380 are outputs 390 of multiple sensors of note. The outputs 390 display the sensor values with respect to time, and include textual data 394 identifying the specific sensor providing the output. In some examples, the outputs 390 are fixed to a predetermined set of important sensors. In alternative examples, the outputs 390 can be configured by the user to display sensor outputs of particular relevance to the user.

In one example, such as a pilot viewing sensor data of a currently in progress flight, the sensor outputs 390 provided are predetermined to display flight critical sensors. In a contrary example, an engine test operator inspecting an engine test of a given system or subsystem, the outputs 390 can be configured by the user to display the sensors most relevant to the system or subsystem being tested. In yet a further example, the sensor outputs 390 are outputs of the most recently anomalous sensors.

Among the benefits capable of being achieved using the MIMODAE system 100 are identification of bad or broken sensors, increasing the return on investment of the existing sensors, providing a human interface that loops a human into the operation to fix a sensor or investigate the cause of an anomaly, and the provision of the interface described above.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A system for providing real time aircraft engine sensor analysis comprising:
    a computer system configured to receive a plurality of engine operation data sets in real time, the computer system including a machine learning based analysis tool;
    a user interface including a main screen, the main screen including an operation tile corresponding to each of the engine operation data sets in the plurality of engine operation data sets, the user interface being configured to display a real time analysis of the engine operation data set, and the user interface including at least one portion configured to identify a plurality of anomalies in the engine operation data set.

2. A system for providing real time aircraft engine sensor analysis comprising:
    a computer system configured to receive an engine operation data set in real time, the computer system including a machine learning based analysis tool;
    a user interface configured to display a real time analysis of the engine operation data set, the user interface including at least one portion configured to identify a plurality of anomalies in the engine operation data set;
    wherein the computer system is configured to receive a plurality of engine operation data sets in real time, and wherein the user interface includes a main screen, the main screen including an operation tile corresponding to each of the engine operation data sets in the plurality of engine operation data sets; and
    wherein each operation tile includes a display indicative of an engine operation completion percentage and at least one text information display.

3. A system for providing real time aircraft engine sensor analysis comprising:
    a computer system configured to receive an engine operation data set in real time, the computer system including a machine learning based analysis tool;
    a user interface configured to display a real time analysis of the engine operation data set, the user interface including at least one portion configured to identify a plurality of anomalies in the engine operation data set;
    wherein the computer system is configured to receive a plurality of engine operation data sets in real time, and wherein the user interface includes a main screen, the main screen including an operation tile corresponding to each of the engine operation data sets in the plurality of engine operation data sets; and
    wherein each operation tile is expandable, and wherein an expanded engine operation tile includes an engine operation completion percentage and a sensor map.

4. The system of claim 3, wherein the sensor map is configured to highlight sensors corresponding to anomalous sensor readings in real time by illuminating a position on the sensor map corresponding to a position of the sensor.

5. The system of claim 4, wherein the sensor map comprises a plurality of engine cross sections along an engine centerline axis.

6. The system of claim 4, wherein a prominence of the illumination corresponds to a time since the occurrence of the anomalous sensor reading.

7. A system for providing real time aircraft engine sensor analysis comprising:
    a computer system configured to receive an engine operation data set in real time, the computer system including a machine learning based analysis tool wherein the machine learning based analysis tool is a multi-input multi output deep auto-encoder (MIMODAE) tool; and
    a user interface configured to display a real time analysis of the engine operation data set, the user interface including at least one portion configured to identify a plurality of anomalies in the engine operation data set.

8. The system of claim 7, wherein the MIMODAE tool includes an input, and wherein the input is configured to be expanded across a decoder portion.

9. The system of claim 8, wherein the decoder portion includes at least three decoder layers.

10. The system of claim 7, wherein the machine learning based analysis tool is trained by providing a plurality of normalized data sets to an encoder portion of the MIMODAE tool.

11. The system of claim 10, wherein the normalized data sets are outputs of at least one engine sensor and wherein the machine learning based analysis tool learns at least one of a correlation between the outputs of at least two engine sensors at a single point in time or a correlation between the output of a single engine sensor at at least two different points in time.

12. The system of claim 10, wherein the encoder portion includes at least three encoder layers.

13. The system of claim 12, wherein each encoder layer in the at least three encoder layers is configured to determine relationships between data points within the plurality of normalized data sets at a given time, and wherein the relationships are indicative of a presence of one or more anomalies.

14. A method for analyzing engine operation data in real time comprising:

receiving at least one engine operations data set in real time, wherein at least one engine operations data set includes at least 1000 sensor data points at each time entry;

analyzing the at least one engine operations data set using a multi-input multi output deep auto-encoder (MIMO-DAE) tool, wherein the MIMODAE includes at least three encoder layers configured to learn relationships among sensor outputs in a plurality of nominal test data sets, and at least three decoder layers configured to analyze relationships between data points in the at least one engine operations data set and determine a presence of an anomaly when a relationship between data points in the at least one engine operations data set diverges from an expected relationship based on a learned relationship among the sensor outputs in the plurality of nominal test data sets.

15. The method of claim 14, wherein the at least one engine operations data set includes a plurality of engine operations data sets, and wherein the plurality of engine operations data sets are simultaneously analyzed.

16. The method of claim 14, further comprising notifying a user of the anomaly in response to determining the presence of the anomaly.

17. The method of claim 16, wherein notifying the user comprises changing a display of a user interface.

18. The method of claim 17, wherein changing the display comprises illuminating a sensor position on a sensor map, and wherein the sensor position corresponds to the sensor providing the anomaly.

19. The method of claim 17, wherein changing the display comprises altering an appearance of an operations tile corresponding to an engine operation data set in the at least one engine operations data set including the anomaly.

* * * * *